(12) United States Patent
Johnson et al.

(10) Patent No.: US 8,366,430 B2
(45) Date of Patent: Feb. 5, 2013

(54) MOLD LOCK KEY SAFETY DEVICE

(75) Inventors: Aaron C. Johnson, Northfield, NH (US); Philip Mutarelli, Merrimack, NH (US)

(73) Assignee: Graham Packaging Company, L.P., York, PA (US)

( * ) Notice: Subject to any disclaimer, the term of this patent is extended or adjusted under 35 U.S.C. 154(b) by 334 days.

(21) Appl. No.: 12/707,974

(22) Filed: Feb. 18, 2010

(65) Prior Publication Data

US 2011/0198784 A1 Aug. 18, 2011

(51) Int. Cl.
*B29C 49/56* (2006.01)
(52) U.S. Cl. ......... 425/151; 425/152; 425/472; 425/541
(58) Field of Classification Search .................. 425/151, 425/152, 472, 522, 541, DIG. 45
See application file for complete search history.

(56) References Cited

U.S. PATENT DOCUMENTS

| | | | | |
|---|---|---|---|---|
| 4,834,642 | A * | 5/1989 | Voss et al. | 425/541 |
| 5,064,366 | A * | 11/1991 | Voss | 425/541 |
| 5,346,386 | A * | 9/1994 | Albrecht et al. | 425/541 |
| 6,918,754 | B2 * | 7/2005 | Albrecht | 425/541 |

OTHER PUBLICATIONS

Mold Opening/Closing Safety, Sidel Servicing Procedure Catalog, SBO 24/SBO 28 Series 2, Oct. 2002, pp. 1-2.

* cited by examiner

*Primary Examiner* — James Mackey
(74) *Attorney, Agent, or Firm* — The Patentwise Group, LLC

(57) ABSTRACT

An improved safety device for a blow molding apparatus is disclosed. The safety device allows the user to trigger or disarm the locking mechanism and return the locking pins to the safe position instead of leaving it in the loaded position. The safety device prevents potential damage to an individual that is accessing the blow molding apparatus.

15 Claims, 7 Drawing Sheets

MOLD LOCK KEY SAFETY DEVICE

BACKGROUND OF THE INVENTION

1. Field of the Invention

The present invention is directed to a safety device. In particular the present invention is directed to a safety device that prevents injuries in a blow molding apparatus.

2. Description of the Related Technology

Sidel series two blow molders have a spring loaded mold locking mechanism. The locking pins, which lock the mold in place, are held in the spring loaded up position prior to locking and there is a trigger pin that when pushed drops the locking pins into the down position. This trigger pin is located behind the upper locking pin in the mold locking mechanism. When using this machine there is a safety risk of finger amputation or getting body parts caught between locking tabs and pins.

Sidel offers a safety device intended to resolve these concerns. However using this device poses it own safety concerns. For example, when Sidel's safety device is used, the locking pins are left in the up, loaded, position. In order to apply or remove the Sidel safety device a person's fingers are in the area of the trigger and locking pins. If the trigger pin is accidentally actuated, the locking pins can drop while fingers are in the mold locking mechanism.

Also the Sidel safety device only goes in the area located near the top locking pin. This leaves the middle and bottom pins exposed. Additionally there seems to be widespread confusion over how to properly use the Sidel safety device, resulting in it not bung used.

Therefore, a desire to safely work on the mold locking mechanism and the shortcomings of the Sidel safety device required development of an improved safety device for a blow molding apparatus.

SUMMARY OF THE INVENTION

An object of the present invention is a safety device for a blow molding apparatus.

An aspect of the present invention may be a safety device for use with a blow molding apparatus comprising: a body comprising; an upper guard arm extending from the body, wherein the upper guard arm is adapted for actuating a trigger on a mold locking mechanism, and wherein the upper guard arm further comprises a guard arm pin hole adapted for passage of a locking pin.

Another aspect of the present invention may be a safety device for use with a blow molding apparatus comprising: a body comprising; an upper guard arm extending from the body, wherein the upper guard arm is adapted for actuating a trigger on a mold locking mechanism, and wherein the upper guard arm is adapted for passage of a locking pin; a lower guard arm having a first opening; and a middle guard aim having a second opening.

Still yet another aspect of the present invention may be a method of safely triggering a mold locking mechanism comprising; placing a safety device into a mold locking mechanism; triggering the mold locking mechanism with the safety device, wherein triggering the mold locking mechanism lowers locking pins located on the mold locking mechanism; removing the safety device when the locking pins are in the lowered position These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

The blow molding apparatus safety device 10 has been developed to remedy the concerns related to Sidel's safety device. The safety device 10 of the present invention triggers the locking pins in the mold locking mechanism leaving them in the down and safe position. The safety device 10 covers all locking pins while the lock is triggered. This prevents the possibility of getting body parts caught. Fingers are kept at a safe distance by using the handle 15 of the safety device 10. Use of the safety device 10 is accomplished by pushing the safety device 10 forward into the mold locking mechanism, triggering the mold locking mechanism and then pulling the safety device 10 backwards and away from the mold locking mechanism.

Figure 1:
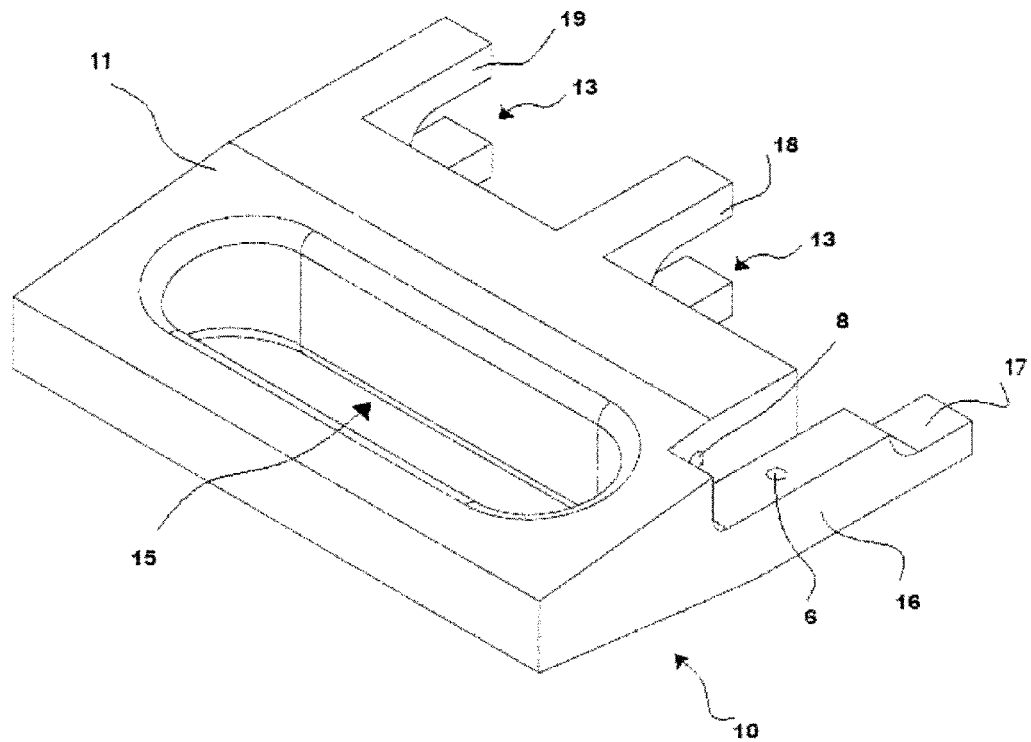
FIG. 1 is a perspective view of a safety device.

Reference is now made to FIGS. 1-7, where the safety device 10 is shown. In FIG. 1, a perspective view of the safety device 10 without the movable guard arm portion 12 attached is shown. The safety device 10 may be made of any durable material, such as plastic, metal, etc. The safety device 10, shown in FIG. 1, is generally rectangular in shape. However, it should be understood that the safety device 10 is not restricted to being rectangular in shape and the rectangular shape is selected for the purpose of ease of construction and is used in the embodiment disclosed herein.

The safety device 10 has three guard arms located on one side of the body 11. The guard arms correspond to the locking pins located on the mold locking mechanism. There is a top guard aim 17, a middle guard arm 18 and a lower guard arm 19 that extend parallel to each other from the body 11. Located on the side opposite to the side with the guard arms is the handle 15. The handle 15 is an oval shaped cutout in the safety device 10 that permits the user of the safety device 10 to firmly grip it when being used. The handle 15 is located opposite the guard arms on the body 11 in order to better protect the body parts when triggering the locking pins. The handle 15 shown is integrally fowled with the safety device 10 however it should be understood that the handle 15 may be attached separately in order to reduce material used in the construction of the safety device 10. For example the handle 15 may be attached with nuts and bolts.

The middle guard arm 18 and lower guard arm 19 each have an opening 13 that permits passage of the locking pins. The openings 13 are "U" shaped to permit easy passage of the locking pins and to also facilitate easy removal of the safety device 10 after the mold locking mechanism has been triggered and the locking pins are in the down position. It should be understood that middle guard arm 18 and the lower guard arm 19 are optionally provided in order to maximize the safety of the person operating the mold locking mechanism 200. The safety device 10 may function with only the upper guard arm 17. Furthermore, in a mold locking mechanism that has more than three locking pins, more than three guard arms may be provided.

Figure 2:
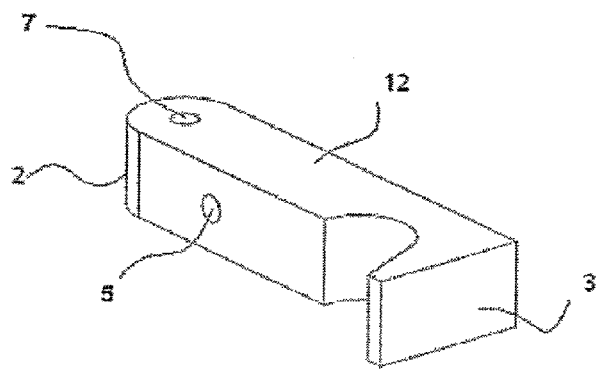
FIG. 2 is a perspective view of an arm used with the safety device shown in FIG. 1.
Figure 3:
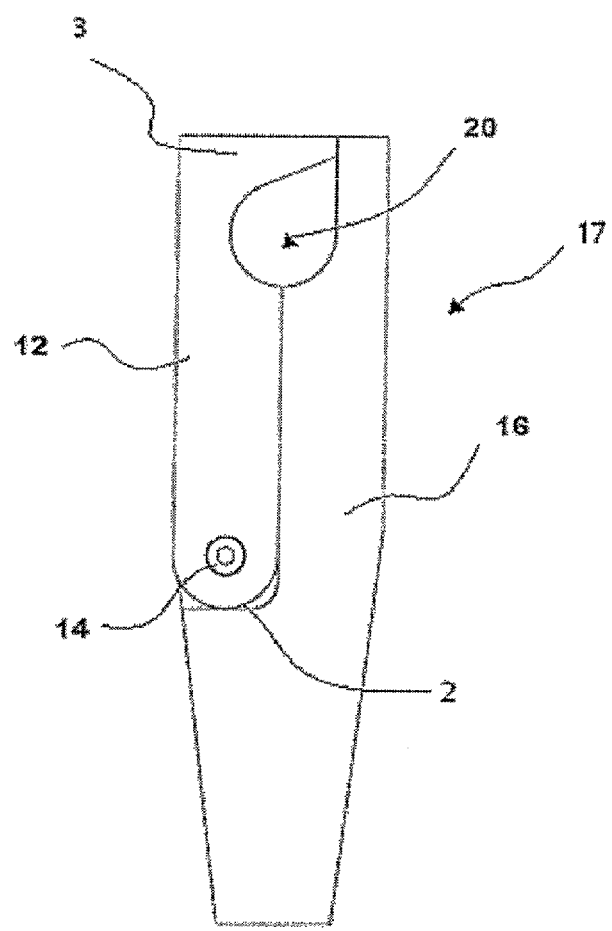
FIG. 3 is a top down view of the safety device.
Figure 4:
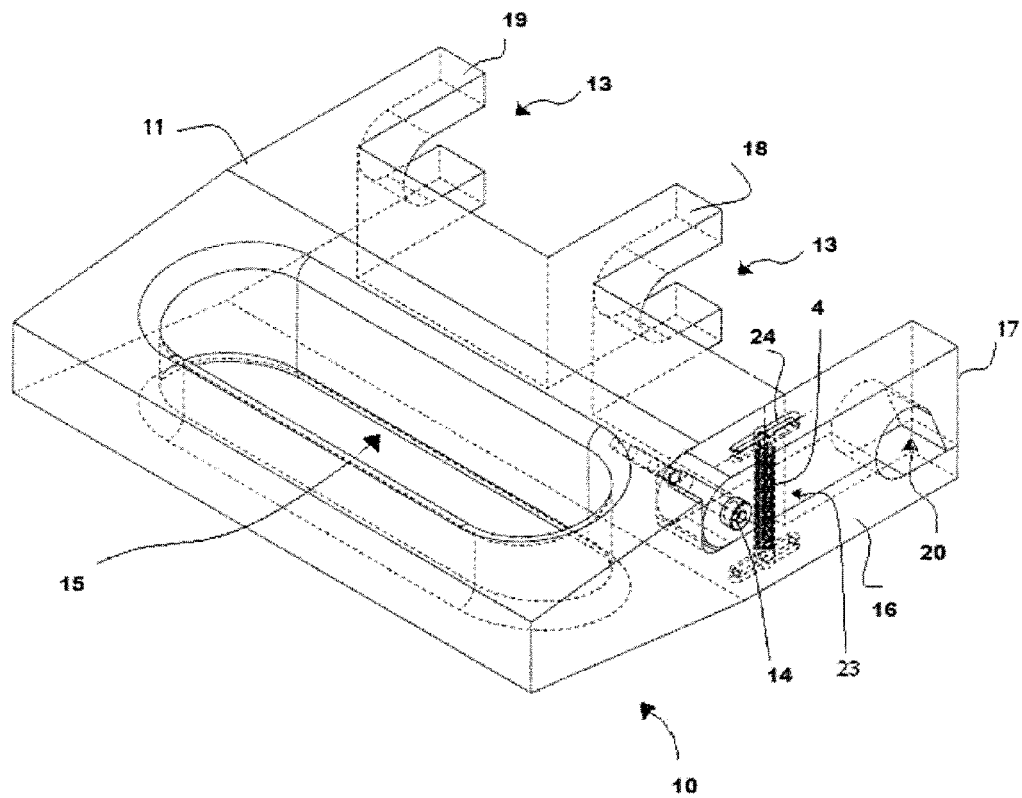
FIG. 4 is another perspective view of the safety device illustrating the interior structure.
Figure 5:
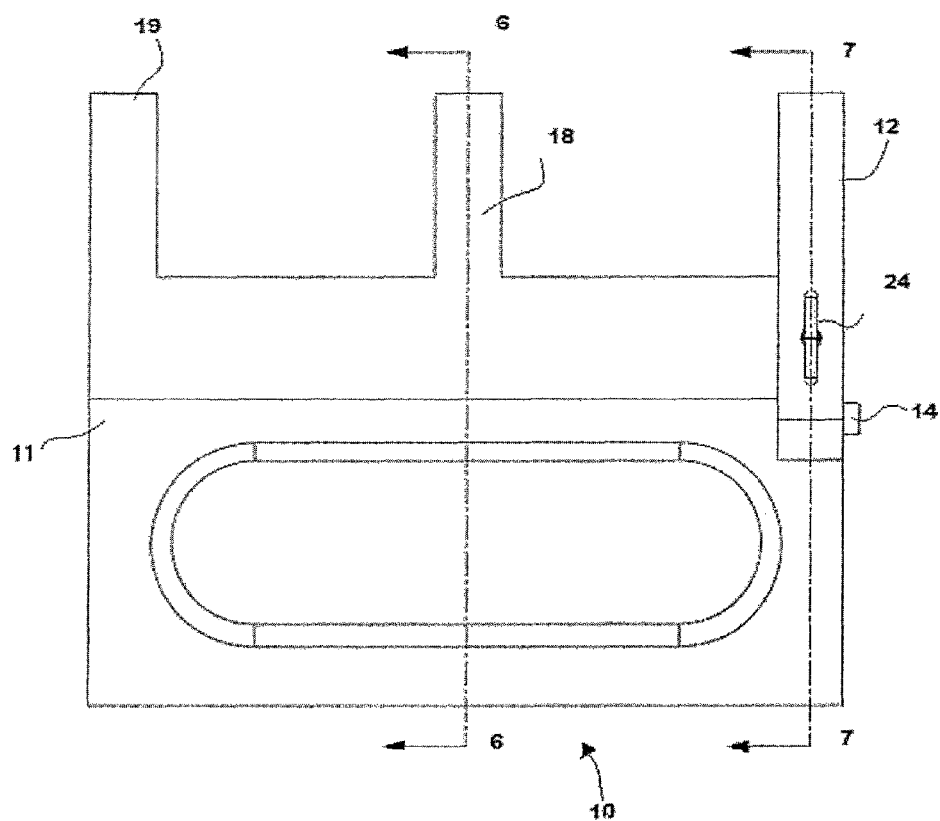
FIG. 5 is a side view of the safety device.
Figure 6:
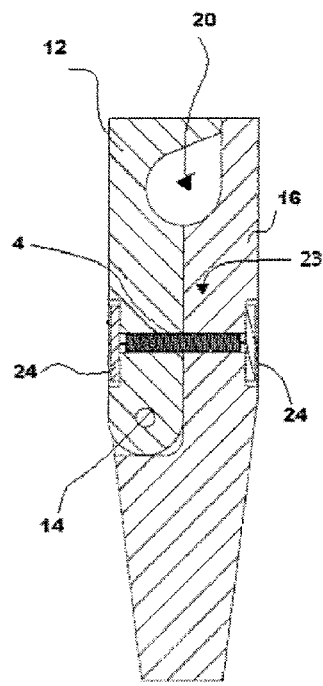
FIG. 6 is a cross-sectional view of the safety device taken along the line 6-6 in FIG. 5.
Figure 7:
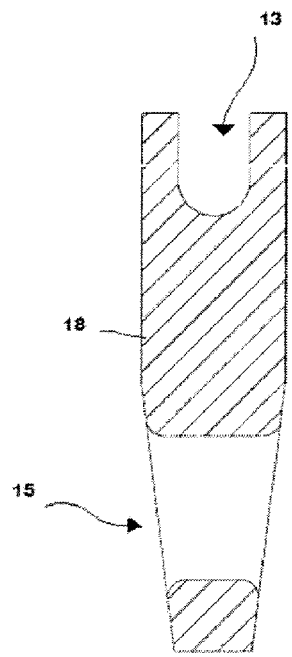
FIG. 7 is a cross-sectional view of the safety device taken along the line 7-7 in FIG. 5.

Referring to FIGS. 1-3, the upper guard arm 17 comprises a movable guard arm portion 12 and a integrally attached guard arm portion 16. The movable guard arm portion 12 is movably attached to the body 11 of the safety device 10 and the integrally attached guard aim portion 16. The movable guard arm portion 12 is attached to the body 11 using hinge member 14. The hinge member 14 is operatively fixed to the body 11 through the body hinge hole 8 and the guard arm hinge hole 7. The movable guard arm portion 12 has a rounded portion 2 that permits smooth pivotal movement of the movable guard arm portion 12 when removing the security device 10 from the mold locking mechanism 200.

The opposite end of the movable guard arm portion 12 has a flat surface portion 3 that is flush with the integrally attached guard arm portion 16. The flat surface portion 3 contacts the trigger 44 to move the locking pins to their down position. When flat surface portion 3 is flush with the attached guard arm portion 16, guard arm pin hole 20 is formed. The guard arm pin hole 20 is sized to accommodate passage of the upper locking pin 45. In the embodiment shown, the guard arm pin hole 20 is a teardrop shaped hole that both facilitates the passage of the upper locking pin 45 and permits easy removal of the safety device after the locking pins are in the down position. It should be understood that while a teardrop shape is shown, other hole shapes may be used provided they permit passage of the upper locking pin 45 and still allow actuation of the trigger 44.

Passing through both the movable guard arm portion 12 and the integrally attached guard arm portion 16 is a spring latching mechanism 23. The spring latching mechanism 23 comprise of spring member 4 and latches 24. The spring 24 is located within the first spring hole 5 located on the movable guard arm portion 12 and the second spring hole 6 located on the integrally attached guard arm portion 16. When the spring 4 is located within the first spring hole 5 and the second spring hole 6 it is held in place using latches 24 located on distal ends of the spring 4. The spring 4 permits easy opening of the movable guard arm portion 12 after the locking pins have been triggered. Other latching mechanisms may be used in place of the spring latching mechanism 23, however they may not provide the ease of use that the spring latching mechanism 23 does.

Figure 8:
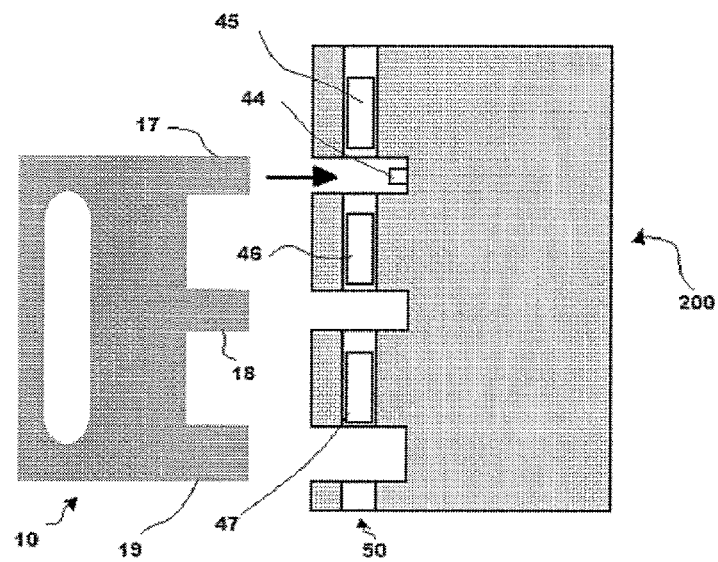
FIG. 8 is a diagram depicting the safety device about to be inserted into the mold locking mechanism.
Figure 9:
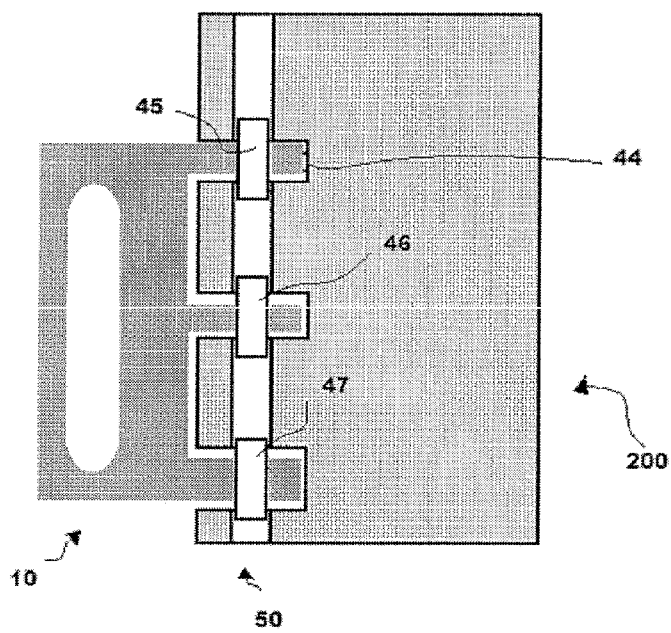
FIG. 9 is a diagram depicting the safety device inserted into the mold locking mechanism.

FIGS. 8 and 9 are diagrams depicting the safety device 10 used with the mold locking mechanism 200. FIG. 8 shows the safety device 10 in the first position prior to insertion into the mold locking device 200. The mold locking mechanism 200 has upper locking pin 45, middle locking pin 46 and lower locking pin 47 that are adapted to pass through the locking pin hole 50. In FIG. 8 the locking pins are in the up position.

In FIG. 9, the safety device 10 is in the second position and the locking pins are in the down position. In the second position the upper guard arm 17 contacts the trigger 44. The upper locking pin 45 passes through the guard arm pin hole 20. The middle locking pin 46 and lower locking pin 47 pass through the openings 13 of the middle guard arm 18 and lower guard arm 19.

Figure 10:
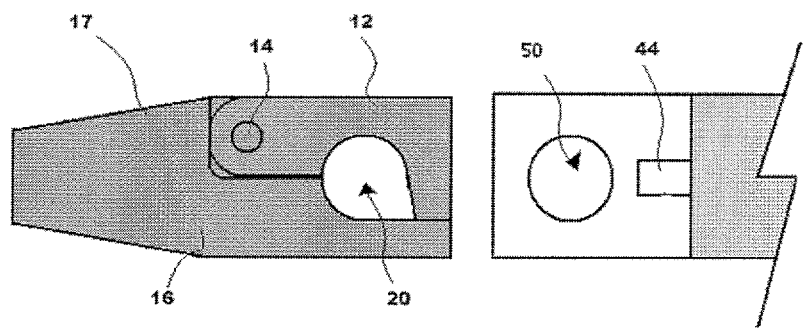
FIG. 10 is a top down view of the safety device and the mold locking pins in the up and loaded position.
Figure 11:
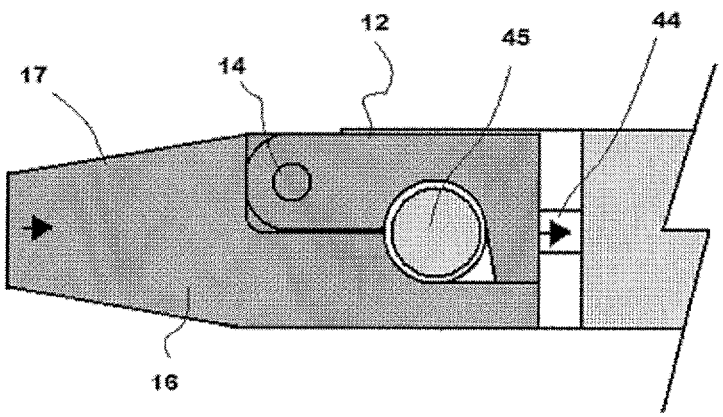
FIG. 11 is a top down view of the safety device and the mold locking pins in the down and unloaded position.
Figure 12:
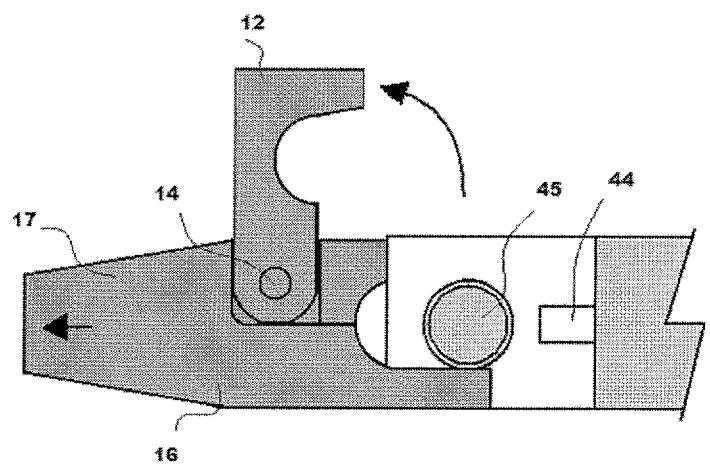
FIG. 12 is a top down view of the safety device being removed from the mold locking mechanism after triggering the locking pins to the safe down position.

FIGS. 10-12 are top down views of the upper guard arm 17 interacting with the mold locking mechanism 200. FIG. 10 shows the upper guard arm 17 approaching the mold locking mechanism 200 and in the first position.

FIG. 11 is a top down view of the safety device 10 and the upper locking pin 45 in the down and unloaded position. In the second position the upper guard arm 17 has struck the trigger 44 and triggered the upper locking pin 45 to be in the down position.

FIG. 12 is a top down view of a safety device 10 being removed from the mold locking mechanism 200 after triggering the locking pins to the safe down position. In the third position the movable guard arm portion 12 is swung away from the upper locking pin 45 and outside of the mold locking mechanism 200. The safety device 10 may then be removed from the mold locking mechanism 200 with ease.

The safety device 10 covers the dangerous areas of the mold locking mechanism 200, allowing the user to trigger, or disarm, the mold locking mechanism 200 and return the locking pins to the safe position instead of leaving it in the loaded position. The safety device is simple to use which makes it more likely to actually be used. The safety device 10 allows the mechanics to work on the mold locking mechanism 200 in the down position safely.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A safety device for use with a blow molding apparatus comprising:
 a body;
 an upper guard arm extending from the body, wherein the upper guard arm is adapted for actuating a trigger on a mold locking mechanism, and
 wherein the upper guard arm further comprises a movable guard arm portion, an integrally attached guard arm portion and a guard arm pin hole adapted for passage of a locking pin.

2. The safety device of claim 1, wherein the body further comprises a lower guard arm and a middle guard arm.

3. The safety device of claim 1, wherein the guard arm pin hole is formed by the movable guard arm portion and the integrally attached guard arm portion.

4. The safety device of claim 1, wherein the movable guard arm portion has a first spring hole formed therein.

5. The safety device of claim 4, wherein the integrally attached guard arm portion comprises a second spring hole formed therein.

6. The safety device of claim 5, further comprising a spring located within the first and second spring holes.

7. A safety device for use with a blow molding apparatus comprising:

a body having a body hinge hole;

an upper guard arm extending from the body, wherein the upper guard arm is adapted for actuating a trigger on a mold locking mechanism, wherein the upper guard arm further comprises a guard arm pin hole adapted for passage of a locking pin; and wherein the upper guard arm further comprises a movable guard arm portion, wherein the movable guard arm portion further comprises a guard arm hinge hole.

8. The safety device of claim 7, wherein a hinge is located within the body hinge hole and the guard arm hinge hole.

9. A safety device for use with a blow molding apparatus comprising:

a body including a handle;

an upper guard arm extending from the body, wherein the upper guard arm is adapted for actuating a trigger on a mold locking mechanism, and wherein the upper guard arm further comprises a guard arm pin hole adapted for passage of a locking pin.

10. A safety device for use with a blow molding apparatus, comprising:

a body;

an upper guard arm extending from the body, wherein the upper guard arm is adapted for actuating a trigger on a mold locking mechanism, and wherein the upper guard arm further comprises a guard arm pin hole adapted for passage of a locking pin, and wherein the body further comprises a lower guard arm and a middle guard arm and the lower guard arm and the middle guard arm each have "U" shaped openings.

11. A safety device for use with a blow molding apparatus comprising:

a body comprising;

an upper guard arm extending from the body, wherein the upper guard arm is adapted for actuating a trigger on a mold locking mechanism, and wherein the upper guard arm further comprises a guard arm pin hole adapted for passage of a locking pin, the guard arm pin hole being tear drop shaped.

12. A safety device for use with a blow molding apparatus comprising:

a body comprising;

an upper guard arm extending from the body, wherein the upper guard arm is adapted for actuating a trigger on a mold locking mechanism, wherein the upper guard arm is adapted for passage of a locking pin, the upper guard arm further comprising a movable guard arm portion and an integrally attached guard arm portion;

a lower guard arm having a first opening; and a middle guard arm having a second opening.

13. The safety device of claim 12, wherein the upper guard arm further comprises a guard arm pin hole formed when the movable guard arm portion is in a closed position and adjacent to the integrally attached guard arm portion.

14. The safety device of claim 13, further comprising a spring located within a first spring hole located on the movable guard arm portion and a second spring hole located on the integrally attached guard arm portion.

15. The safety device of claim 14, further comprising a hinge located between the movable guard arm portion and the body.

* * * * *